United States Patent Office  3,499,919
Patented Mar. 10, 1970

3,499,919
4 - ALKYL AND CYCLOHEXYL ALKYL DICYCLOHEXYL PEROXYDICARBONATES
Hans G. Gerritsen, Deventer, Hendrik Hansma, Schalkhaar, and Hans Jaspers, Deventer, Netherlands, assignors to Koninklijke Industrieele Maatschappij Noury & van der Lande N.V., Deventer, Netherlands, a corporation of the Netherlands
No Drawing. Filed Feb. 17, 1967, Ser. No. 616,775
Claims priority, application Great Britain, Feb. 28, 1966, 8,714/66
Int. Cl. C07c 73/00, 69/00; C08f 1/60
U.S. Cl. 260—453       6 Claims

ABSTRACT OF THE DISCLOSURE

The present invention relates to 4-substituted dicyclohexylperoxydicarbonates capable of use, for example, in the polymerization of polymerizable unsaturated monomers; the invention also relates to a process for preparing the 4-substituted dicyclohexylperoxydicarbonates and to polymerizable compositions consisting essentially of a polymerizable monomer and a 4-substituted dicyclohexylperoxydicarbonate. The 4-substituent is a cyclohexyl radical or an alkyl radical or a cyclohexylalkyl radical, said alkyl or cyclohexylalkyl radical having up to 10 carbon atoms.

BACKGROUND OF THE INVENTION

Field of the invention

The present invention lies in the field of novel organic peroxidic compounds, methods for their synthesis, their use in the peroxidic polymerization of polymerizable unsaturated monomers, and the corresponding polymerizable compositions.

Description of the prior art

It is known that diisopropyl, di-n-butyl and dicyclohexyl peroxydicarbonates are effective as initiators in the polymerization of polymerizable unsaturated monomers. Typical compounds which may be polymerized are those containing vinyl groups, such as vinyl chloride, vinylidene chloride, vinyl bromide, acrylamide, N-substituted methacrylamides, acrylonitrile, vinyl acetate, methylmethacrylate or compounds containing allyl groups such as allyl acetate, diethyleneglycol-bis(allylcarbonate) and other polymerizable compounds, such as ethylene. However, the above-mentioned prior art peroxydicarbonates have the drawback that they decompose at room temperature and, at slightly higher temperatures, decompose explosively. Due to this undesirable characteristic, these prior art peroxydicarbonates may only be handled, transported and stored under refrigeration.

SUMMARY OF THE INVENTION

Surprisingly, it has now been found that previously unknown 4-substituted dicyclohexylperoxydicarbonates having the structural formula

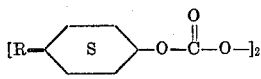

in which R represents a cyclohexyl radical or an alkyl radical or a cyclohexylalkyl radical, said alkyl or cyclohexylalkyl radicals having up to 10 carbon atoms, are stable at room temperature so that they need not be refrigerated or otherwise stabilized during transport and/or storage.

The novel 4-substituted dicyclohexylperoxydicarbonates are solid at room temperature and they may be used as oxidizing agents in bleaching flour, as driers for linseed, tung, soyabean and other oils, as initiators in the polymerization of polymerizable unsaturated monomers containing vinyl groups, such as vinyl chloride, vinylidene chloride, vinyl bromide, acrylamide, N-substituted methacrylamides, acrylonitrile, vinyl acetate, methylmethacrylate or compounds containing allyl groups such as allyl acetate, diethyleneglycol-bis(allylcarbonate) and other polymerizable compounds, such as ethylene.

As initiators in the polymerization of vinyl chloride, the 4-substituted dicyclohexylperoxydicarbonates are more effective in equivalent molar amounts than the peroxydicarbonates hitherto employed which is advantageous from an economical point of view. 4-substituted dicyclohexylperoxydicarbonates preferably used in accordance with the present invention are bis(4-isopropylcyclohexyl)peroxydicarbonate, bis(4-tertiarybutylcyclohexyl)peroxydicarbonate, bis(4-tertiaryamyl-cyclohexyl)peroxydicarbonate, bis(4-cyclohexylisopropylcyclohexyl)peroxydicarbonate, bis(4-cyclohexylcyclohexyl)peroxydicarbonate.

The 4-substituted dicyclohexylperoxydicarbonates according to the present invention may be prepared by reacting the corresponding haloformates, preferably the chloroformates, with an aqueous alkaline hydrogen peroxide solution, preferably an aqueous sodium hydroxide-hydrogen peroxide solution, at a temperature below 45° C. and isolating the peroxydicarbonates thus formed.

DESCRIPTION OF THE PREFERRED EMBODIMENTS

In order still better to illustrate the nature of the present invention the following detailed examples are set forth, it being understood, however, that this description and these examples are presented here by way of illustration only and not as limiting the scope of the invention.

EXAMPLE 1

109.2 g. of an aqueous 33% w./w. NaOH solution were added with stirring to 36.7 g. of aqueous 50% w./w. $H_2O_2$ solution and 675 ml. of water. The temperature of the mixture was then adjusted to 40° C. Subsequently 0.69 ml. of an aqueous 27% w./w. sodium (7-ethyl-2-methyl-undecyl-4)sulphate (trademark Tergitol An–4) were added as an emulsifier.

208.1 g. of 94.5% 4-tertiarybutylcyclohexylchloroformate were added dropwise with continuous stirring at 40° C. for 45 minutes and subsequently 7.4 g. of an aqueous 50% w./w. $H_2O_2$-solution, whereupon stirring was continued for 45 minutes at 40° C. After cooling the reaction mixture to room temperature, the peroxydicarbonate formed was filtered off at 30° C., dried and recrystallized from pentane. 196 g. of bis(4-tertiarybutylcyclohexyl) peroxydicarbonate were obtained, yield 92% (calculated on the 4-tertiarybutylcyclohexylchloroformate charged).

EXAMPLE 2

In the same way as described in Example 1, bis(4-tertiaryamylcyclohexyl)peroxydicarbonate was prepared starting from 4-tertiaryamylcyclohexylchloroformate.

EXAMPLE 3

In the same way as described in Example 1, bis(4-isopropylcyclohexyl)peroxydicarbonate was prepared starting from 4-isopropylcyclohexylchloroformate.

EXAMPLE 4

In the same way as described in Example 1, bis(4-cyclohexylisopropylcyclohexyl)peroxydicarbonate was prepared starting from 4-cyclohexylisopropylcyclohexylchloroformate.

EXAMPLE 5

In the same way as described in Example 1, bis(4-cyclohexylcyclohexyl)peroxydicarbonate was prepared starting from 4-cyclohexylcyclohexylchloroformate.

Data relating to the several peroxydicarbonates thus prepared according to the respective Examples 1–5 are as follows:

|  | Example |  |  |  |  |  |  |  |  |  |
|---|---|---|---|---|---|---|---|---|---|---|
|  | 1 |  | 2 |  | 3 |  | 4 |  | 5 |  |
|  | Det. | Calc. | Det. | Calc. | Det. | Calc. | Det. | Calc. | Det. | Calc. |
| Percent: |  |  |  |  |  |  |  |  |  |  |
| Act. O | 4.00 | 4.03 | 3.71 | 3.75 | 4.23 | 4.32 | 2.90 | 2.99 | 3.48 | 3.55 |
| Act. C | 66.31 | 66.20 | 67.75 | 67.60 | 64.13 | 64.95 | 72.27 | 71.90 | 69.55 | 69.30 |
| Act. H | 9.65 | 9.62 | 10.02 | 9.93 | 9.42 | 9.25 | 10.46 | 10.17 | 9.63 | 9.39 |
| Peroxide | 99.0 |  | 99.0 |  | 98.0 |  | 97.0 |  | 98.0 |  |

EXAMPLE 6

In order to determine their stability, samples both of peroxydicarbonates according to the present invention and of known peroxydicarbonates were placed in a "Pyrex" glass tube and kept at a constant temperature of 30° C. using a constant temperature bath.

The rate of decomposition of the peroxydicarbonates was measured by determining the active oxygen content of the samples at given time intervals. The data obtained are tabulated hereafter:

| $\left[ Z-O-\overset{O}{\underset{\|}{C}}-O \right]_2$ Z being: | Stability at 30° C. |
|---|---|
| 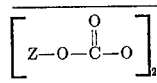 | Complete decomposition within 0.5 hour. |
| n-C₄H₉— | Complete decomposition within 2 days. |
|  | Do. |
|  | Do. |
| 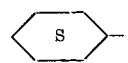 | No decomposition after 2 months. |
| 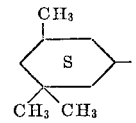 | Do. |
| 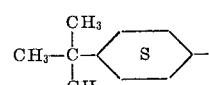 | Do. |
| 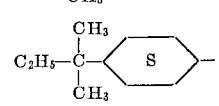 | Do. |

EXAMPLE 7

The following composition was used in the suspension polymerization of vinyl chloride:

|  | Parts |
|---|---|
| Vinyl chloride | 100 |
| Distilled water | 300 |
| "Elvanol" 50–42 (a polyvinyl alcohol) | 0.3 |

Peroxydicarbonate, various amounts, as indicated below.

| Peroxydicarbonate | Peroxydicarbonate conc. in mmoles/kg. monomer | Polym. time in hours | Percent conversion |
|---|---|---|---|
| No. 1 | 2.5 | 6 | 75 |
| No. 2 | 2.5 | 6 | 76 |
| No. 3 | 2.5 | 6 | 90 |
| No. 4 | 2.5 | 6 | 88 |
| No. 1 | 5 | 6 | 95 |
| No. 2 | 5 | 6 | 95 |
| No. 3 | 5 | 4 | 95 |
| No. 4 | 5 | 4 | 93 |
| No. 1 | 10 | 4 | 96 |
| No. 2 | 10 | 4 | 97 |

No. 1 = diisopropylperoxydicarbonate.
No. 2 = dicyclohexylperoxydicarbonate.
No. 3 = bis(4-tertiarybutylcyclohexyl)peroxydicarbonate.
No. 4 = bis(4-tertiaryamyl-cyclohexyl)peroxydicarbonate.

From the foregoing table it can readily be seen that with bis(4-tertiarybutylcyclohexyl)peroxydicarbonate or with bis(4-tertiaryamylcyclohexyl)peroxydicarbonate employed in the same molar ratio and in the same time, a higher conversion is obtained than with diisopropylperoxydicarbonate or with dicyclohexylperoxydicarbonate; or alternatively, the same conversion is achieved within a shorter time.

What is claimed is:

1. An organic peroxydicarbonate having the general formula

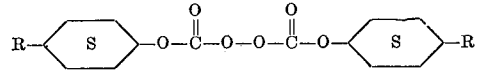

in which R represents a cyclohexyl radical or an alkyl or cyclohexylalkyl radical, said alkyl or cyclohexylalkyl radicals having from 3 to 10 carbon atoms, and being bound to the

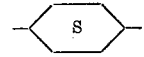

nucleus through a secondary or tertiary carbon atom.

2. A compound as defined in claim 1, wherein the organic peroxydicarbonate is bis(4-isopropylcyclohexyl) peroxydicarbonate.

3. A compound as defined in claim 1, wherein the organic peroxydicarbonate is bis(4-tertiarybutylcyclohexyl)peroxydicarbonate.

4. A compound as defined in claim 1, wherein the organic peroxydicarbonate is bis(4-tertiaryamylcyclohexyl)peroxydicarbonate.

5. A compound as defined in claim 1, wherein the organic peroxydicarbonate is bis(4-cyclohexylisopropylcyclohexyl)peroxydicarbonate.

6. A compound as defined in claim 1, wherein the organic peroxydicarbonate is bis(4-cyclohexylcyclohexyl)peroxydicarbonate.

References Cited

UNITED STATES PATENTS

| | | | |
|---|---|---|---|
| 2,370,588 | 2/1945 | Strain | 260—453 |
| 2,517,964 | 8/1950 | Bissinger | 260—453 |
| 3,108,093 | 10/1963 | Pajaczkowski et al. | 260—453 X |
| 3,377,373 | 4/1968 | Lederer et al. | 260—463 |

OTHER REFERENCES

Strain et al., Journal of the American Chemical Society, vol. 72, pp. 1254–1263 (1950).

CHARLES B. PARKER, Primary Examiner

S. T. LAWRENCE III, Assistant Examiner

U.S. Cl. X.R.

99—118, 163, 232; 106—310; 260—88.7, 89.1, 89.5, 89.7, 91.1, 92.8, 94.9, 463